United States Patent
Goto et al.

(10) Patent No.: US 7,208,722 B2
(45) Date of Patent: Apr. 24, 2007

(54) MEASURING METHOD AND MEASURING APPARATUS FOR COHERENT CROSSTALK LIGHT

(75) Inventors: Ryosuke Goto, Kawasaki (JP); Motoyoshi Sekiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 211 days.

(21) Appl. No.: 11/083,015

(22) Filed: Mar. 18, 2005

(65) Prior Publication Data

US 2006/0124842 A1    Jun. 15, 2006

(30) Foreign Application Priority Data

Dec. 8, 2004    (JP) .............................. 2004-355289

(51) Int. Cl.
G01N 21/25    (2006.01)
(52) U.S. Cl. .............................. 250/227.23; 250/227.19
(58) Field of Classification Search ........... 250/227.23, 250/227.19, 227.14, 226; 398/194, 183, 398/187, 79
See application file for complete search history.

(56) References Cited

U.S. PATENT DOCUMENTS 6,134,037 A * 10/2000 Shabeer et al. ............. 398/157

2003/0026524 A1    2/2003 Kakizaki et al.

FOREIGN PATENT DOCUMENTS

JP    10-148596    6/1998
JP    2003-51785    2/2003

* cited by examiner

*Primary Examiner*—Que T. Le
(74) *Attorney, Agent, or Firm*—Staas & Halsey LLP

(57) ABSTRACT

An apparatus for measuring coherent crosstalk (CXT) light of the invention generates in a light source section, measurement light which has been modulated to a sawtooth wave shape and applies this to an object of measurement; sends transmission light and CXT light emerging from the object of measurement to a light receiving section via a variable optical attenuator; applies an electrical signal photoelectric-converted in an optical receiver, to a frequency filter, to thereby extract a beat component corresponding to a frequency difference between the transmission light and CXT light; controls the modulation period of the measurement light so that the power of the beat component becomes a local maximum; varies an optical attenuation amount of a variable optical attenuator, while keeping constant the optimized modulation period; and measures with high accuracy the amount of CXT light generated in the object of measurement, based on a rate of variation in the power of the beat component caused at that time.

13 Claims, 14 Drawing Sheets

MEASURING METHOD AND MEASURING APPARATUS FOR COHERENT CROSSTALK LIGHT

BACKGROUND OF THE INVENTION (1) Field of the Invention

The present invention relates to a method and apparatus for measuring coherent crosstalk light, which is a cause of deterioration in signal quality in an optical transmission system.

(2) Description of the Related Art

In the transmission devices and transmission paths in optical transmission systems, there are several junctions where optical fibers connect to each other. These junctions are in the form of an optical connector or a splice (fusion splice), and at these junctions, part of the signal light is reflected (through Fresnel reflection, for example) due for example to gaps in the engagement part of the optical connector or contamination at the end faces of the connector. When there are several of these reflection points, then as shown for example in FIG. 22, a portion of the signal light is reflected repeatedly at the various reflection points, and the component in this multiple reflected light which travels in the same direction as the signal light ultimately becomes coherent crosstalk (hereunder referred to as CXT) light. CXT light generates beat noise in the signal light in the receiver, causing deterioration in signal quality such as bit error rate (BER), for example. Typically, the amount of CXT light generated (referred to as the CXT amount below) is defined by the following formula (1), using the power $P_{TR}$ of the primary signal light transmitted through the plurality of reflection points, and the power $P_{XT}$ of the multiple reflected light (CXT light) which travels in the same direction as the primary signal light.

$$CXT \text{ amount} = P_{XT}/P_{TR} \quad (1)$$

FIG. 23 shows an example of calculating the relationship of the signal quality (in terms of the transmission penalty) with respect to the CXT amount. From FIG. 23 it is apparent that when the CXT amount increases, the transmission penalty increases rapidly, and the signal quality deteriorates.

Accordingly, if the CXT light which is actually being generated can be measured, it is possible to find out which location in an optical transmission system with a large number of optical parts is having an adverse effect, and provide a prompt and easy solution (for example cleaning the reflection points or replacing the connector). However, as is also apparent from the optical spectra shown on the right side of FIG. 22, the optical frequency of the CXT light is exactly the same as that of the transmission light, which means that both types of light overlap completely in the optical spectrum. Therefore, it is impossible to differentiate between them, and consequently, it has been difficult to directly measure only the CXT light.

Consequently, in conventional technology, instead of measuring the CXT light directly, it is typically most common for measurement based on reflected light detection such as optical time domain reflectometry (OTDR) to be performed with an object of measuring the location of reflection points and the reflected amount. In this method, the position of reflection points and the amount of reflection are calculated by detecting the light which is actually returned from the reflection points. However, the measuring apparatuses which are currently most often used to implement this method have a construction which is inherently suitable for measuring the reflection points within transmission paths with lengths of up to several dozen kilometers, but are not well suited to use in locations where the optical paths are short, for example in the measurement of reflection points in optical components within an optical transmission device.

On the other hand, as a method which has few limitations in terms of measurement distance resolution, technology which enables accurate measurement of reflection light power, in reflectometry (OCDR) using synthesis of the optical coherence function, by pulsing the output light, for example, has been proposed (see Japanese Unexamined Patent Publication No. 10-148596, for example). Furthermore, as a method of detecting the reflection points in the various optical components in a device, technology where the reflection light generated in the device is detected for example by respectively providing reflection monitors at the input ports and output ports of each component, has been proposed (see Japanese Unexamined Patent Publication No. 2003-51785, for example).

However, such conventional technology presents a problem in that in theory, when detecting light returning from the reflection points, if a unidirectional optical component (for example an optical isolator) is positioned in the object of measurement, the reflected light is cut out at that point and cannot be measured.

Furthermore, although the conventional technology described above has sufficiently high distance resolution for specifying the reflection points, because accurately measuring the reflectance is not an object of this technology, it is not suited as a device for measuring the amount of CXT light. Hypothetically, even if the reflectance could be measured accurately by applying the conventional technology, the only way to determine the actual CXT amount is to estimate the CXT amount by calculating it indirectly based on the reflectance. In other words, technology which measures the ratio of the power of the CXT light with respect to the power of the primary signal light which passes through a plurality of reflection points is yet to be realized.

SUMMARY OF THE INVENTION

The present invention addresses the above points, with an object of providing a method and device which can measure reliably and with high accuracy whether or not coherent crosstalk is generated as well as the amount generated, regardless of whether a unidirectional optical component is positioned within the object of measurement or not, by directly detecting the transmitted light which passes through the inside of the object of measurement and the multiple reflected light which travels in the same direction as the transmitted light.

In order to achieve this object, a CXT light measuring method according to the present invention is a method of measuring CXT light generated by multiple reflection of light between a plurality of reflection points existing within an object of measurement, comprising: generating measurement light in which the frequency of a light emitted from a laser light source operating under single longitudinal mode oscillation is modulated to a sawtooth wave shape at a variable period, and irradiating the generated measurement light into one end of an optical path which passes through the inside of the object of measurement. Next, the light emerging from the other end of the optical path of the object of measurement is received by an optical receiver and converted to an electrical signal, the converted electrical signal is applied to a frequency filter, and a beat component of a frequency corresponding to half the difference between the maximum value and minimum value of the optical frequency of the measurement light is extracted. Then the modulation period of the measurement light is controlled so that the power of the extracted beat component becomes a local maximum, and whether or not CXT light is generated in the object of measurement is measured based on the power of the beat component which has become the local maximum due to control of the modulation period.

Furthermore, the above measurement method may comprise: varying an optical attenuation amount of a variable optical attenuator which is provided prior to the optical receiver, while keeping constant the modulation period which is controlled so that the power of the extracted beat component becomes the local maximum; and measuring the amount of CXT light generated in the object of measurement, based on the rate of variation in the power of the beat component caused by variation in the optical attenuation amount.

A measuring apparatus for CXT light according to the present invention is a measuring apparatus for measuring CXT light generated by multiple reflection of light between a plurality of reflection points existing within an object of measurement, comprising: a light source section which generates a measurement light in which the frequency of a light emitted from a laser light source operating under single longitudinal mode oscillation is modulated to a sawtooth wave shape at a variable period; an optical output port for irradiating the measurement light generated by the light source section into one end of an optical path which passes through the inside of the object of measurement; an optical input port to which the light emitted from the other end of the optical path of the object of measurement is applied; a light receiving section which receives the light from the optical input port using an optical receiver and converts the light to an electrical signal, and then applies the electrical signal to a frequency filter, and extracts a beat component of a frequency which corresponds to half the difference between the maximum value and minimum value of the optical frequency of the measurement light; a modulation period control section which controls the modulation period of the measurement light generated by the light source section so that the power of the beat component extracted by the light receiving section becomes a local maximum; and a measuring section which measures whether or not CXT light is generated in the object of measurement, based on the power of the beat component which has become the local maximum due to control of the modulation period by the modulation period control section.

Furthermore, the abovementioned measuring apparatus may include; a variable optical attenuator provided on an optical path between the input port and the light receiving section, and an optical attenuation amount control section which varies the optical attenuation amount of the variable optical attenuator, while keeping constant the modulation period controlled by the modulation period control section so that the power of the beat component extracted by the optical receiving section becomes the local maximum, and the measuring section may measure the amount of CXT light generated in the object of measurement, based on a rate of variation in the power of the beat component produced by varying the optical attenuation amount of the variable optical attenuator by the optical attenuation amount control section.

In the CXT light measuring method and apparatus according to the present invention as described above, when the measurement light, which is frequency modulated to a sawtooth wave shape, is applied to the object of measurement, deviation occurs between the frequencies of the transmitted light emitted from the object of measurement and the multiple reflected light (CXT light) which travels in the same direction as the transmitted light, and by converting the light emitted from the object of measurement to an electrical signal in the optical receiver and then passing the resulting signal through a frequency filter, it is possible to obtain, in a stable manner, a beat component corresponding to the optical frequency difference between the transmitted light and the multiple reflected light. Then by optimizing the modulation period of the measurement light so that the power of the beat component is stable at the local maximum, and monitoring the power of the beat component at that time, it is possible to measure whether or not CXT light is being generated within the object of measurement. Furthermore, by varying the power of the light applied to the light receiving section, by means of the variable optical attenuator while keeping constant the optimized modulation period, and monitoring the rate of variation of the power of the beat component at that time, it is possible to measure the CXT amount in the object of measurement.

According to the CXT light measuring method and apparatus according to the present invention as described above, by irradiating measurement light which has been frequency modulated to a sawtooth wave shape, into the object of measurement, and detecting the beat frequency component of the transmitted light and the CXT light emitted from the object of measurement, whether or not CXT light is generated and the amount generated can be measured reliably and with high accuracy regardless of whether or not a unidirectional optical component is positioned in the object of measurement.

Other objects, features and advantages of the present invention will become apparent from the following description of the embodiments, in conjunction with the appended drawings.

DETAILED DESCRIPTION OF THE INVENTION

Figure 1:
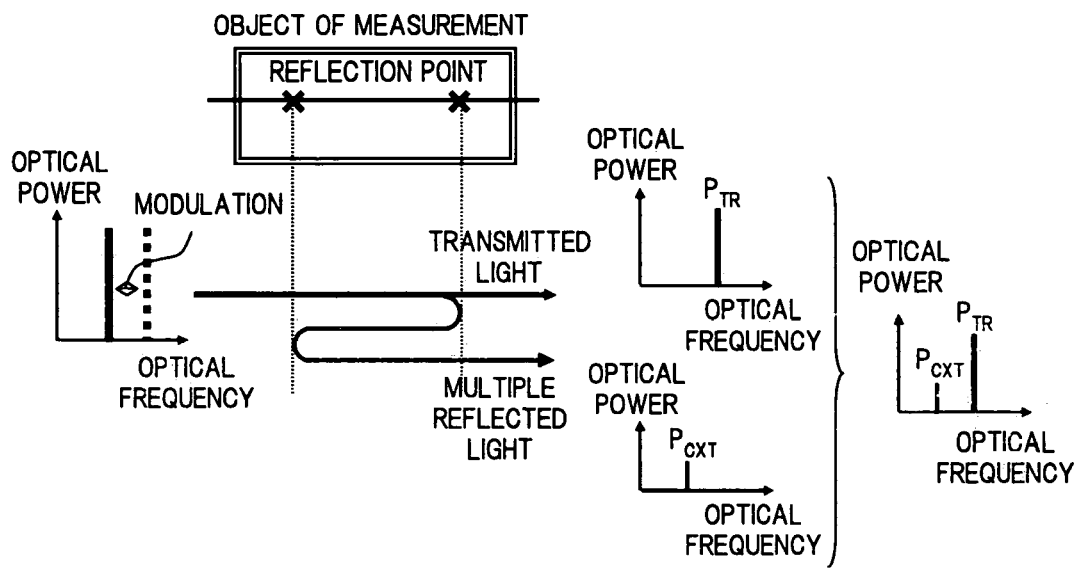
FIG. 1 is a diagram describing the basic concept of a CXT light measuring method according to the present invention.

A best mode for carrying out the present invention is described below with reference to the appended drawings. Throughout all of the diagrams, the same reference numerals refer to the same or corresponding parts.

First, the basic concept of a CXT light measuring method according to the present invention is described with reference to FIG. 1.

As shown in the middle part of FIG. 1, when there are a plurality of reflection points inside the object of measurement (two points in this case), the incident light applied to the object of measurement from the left in the diagram undergoes multiple reflections at the various reflection points, and the component which propagates in the same direction as the incident light is emitted to the right of the object of measurement. In this case, in the present measuring method, by applying frequency modulation (frequency variation) to the incident light as shown on the left side of FIG. 1, thereby causing deviation in the optical frequencies of the transmitted light emitted from the object of measurement, and the multiple reflected light which travels in the same direction as the transmitted light, a state results in which it is possible to differentiate between the transmitted light and the multiple reflected light (CXT light) on the optical spectrum, as shown on the right side of FIG. 1. Then when the light emitted from the object of measurement is received with the deviation in optical frequencies, and the signal is converted to an electric signal, it is possible to obtain a beat frequency component corresponding to the optical frequency difference between the transmitted light and the multiple reflected light. Because the power of this beat component has a correlation to the transmitted light power and the multiple reflected light power, detection of this beat component enables the CXT amount to be measured directly.

Figure 2:
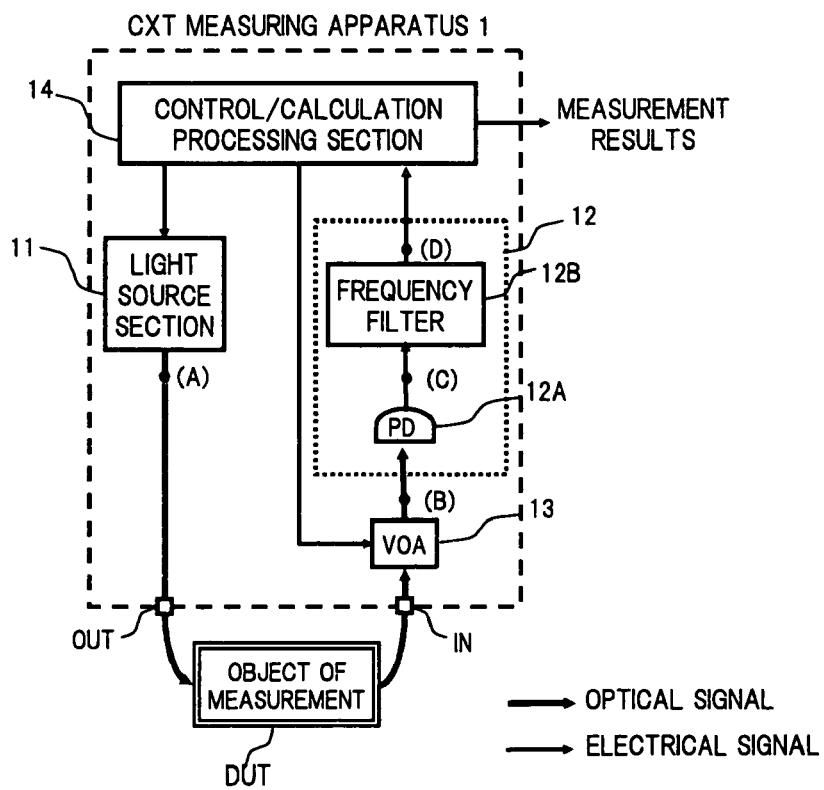
FIG. 2 is a block diagram showing the basic construction of a CXT measuring apparatus according to the present invention.

FIG. 2 is a block diagram showing the basic construction of a CXT measuring apparatus to which the measuring method described above is applied.

In FIG. 2, the CXT measuring apparatus 1 comprises four blocks, namely a light source section 11, a light receiving section 12, a variable optical attenuator (VOA) 13, and a control/calculation processing section 14.

The light source section 11 is a known laser light source operating under single longitudinal mode oscillation, which is driven by output signals from the control/calculation processing section 14 and emits frequency modulated light. The emitted light from this light source section 11 enters an object of measurement DUT via an output port OUT.

The light receiving section 12 comprises for example a photodetector (PD) 12A and a frequency filter 12B. The emitted light from the object of measurement DUT is input to the photodetector 12A via an input port IN and the variable optical attenuator 13, and the input light is converted to an electrical signal and then output. The frequency filter 12B is an electric filter which extracts only a specific frequency component ($\Delta f/2$) as described below, from the electrical signal output from the photodetector 12A.

The variable optical attenuator 13 is a typical optical attenuator capable of varying the amount of optical attenuation, and is inserted between the input port IN and the light receiving section 12. The amount of optical attenuation of this variable optical attenuator 13 is controlled according to output signals from the control/calculation processing section 14, as described below.

The control/calculation processing section 14 measures the CXT amount in the object of measurement DUT by controlling the modulation frequency of the light source section 11 and the amount of optical attenuation of the variable optical attenuator 13, while processing the electrical signal output from the light receiving section 12. Here, the control/calculation processing section 14 functions as a modulation period control section, an optical attenuation amount control section, a storage section, and a measuring section.

Figure 3:
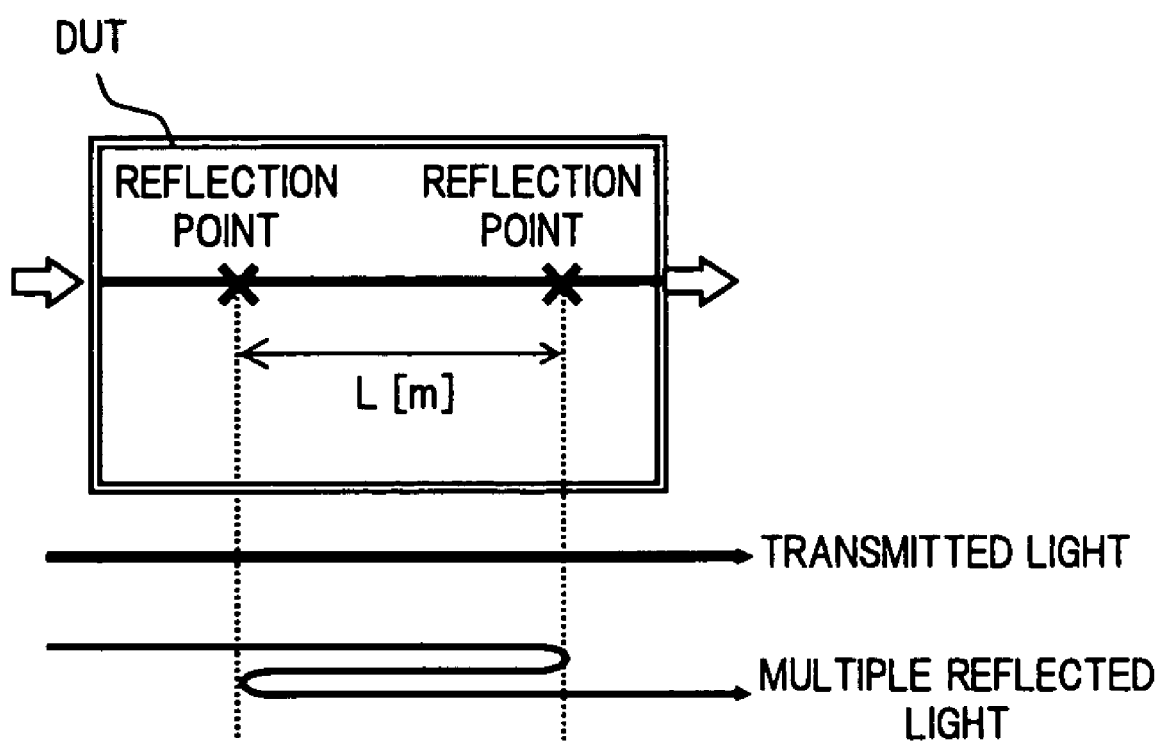
FIG. 3 is a diagram showing an example of reflection points existing within an object of measurement.

Next, the theory of the operation of the CXT measuring apparatus 1 is described. Here the description assumes that the object of measurement DUT has two reflection points separated by a distance L [m] as shown in FIG. 3, for example. However, in theory, the present invention is capable of measuring the CXT amount even when there are three or more reflection points in the object of measurement DUT, and details of such a case will be described later.

Figure 4:
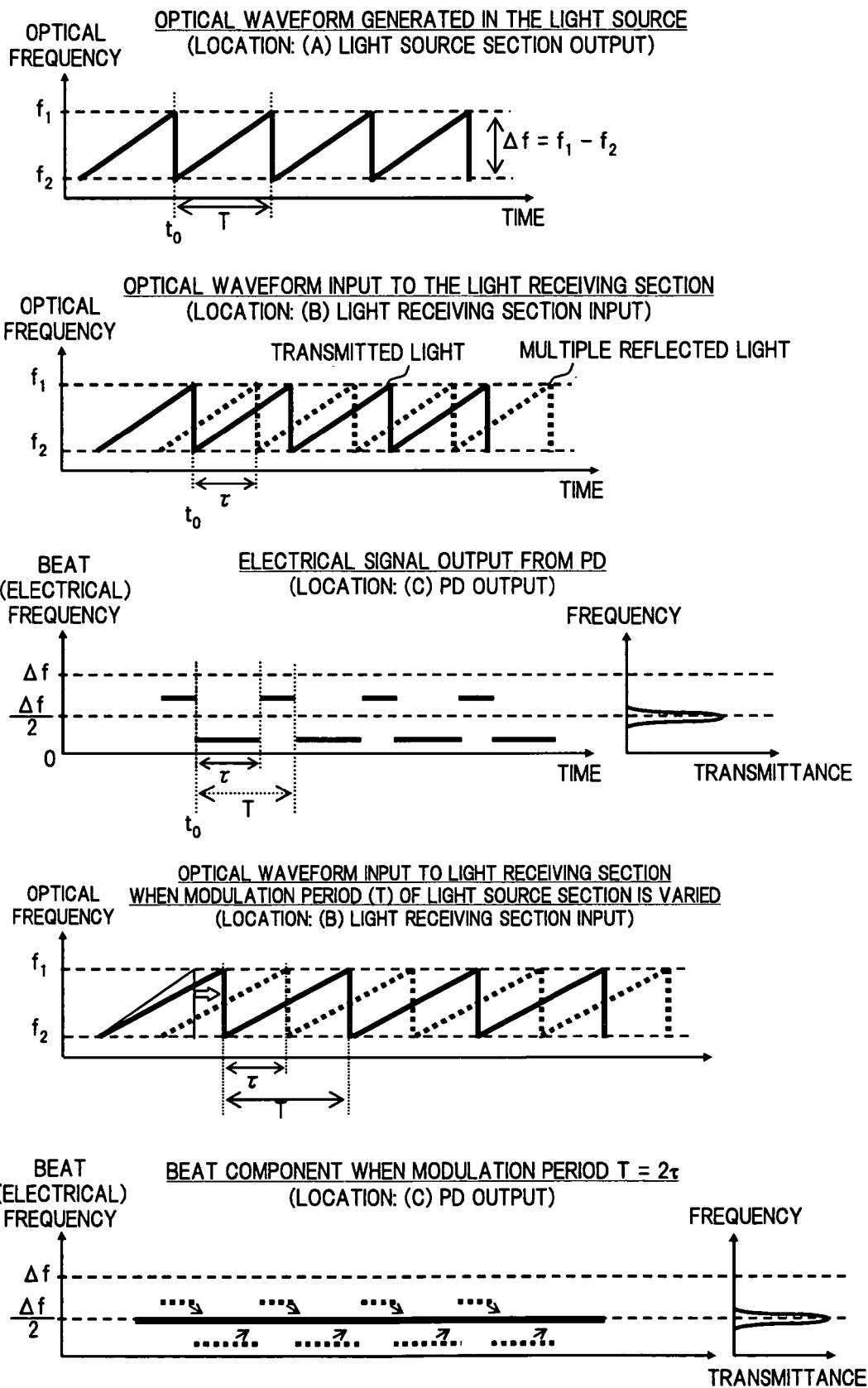
FIG. 4 is a diagram showing aspects of an optical waveform or electrical waveform in various locations in the CXT measuring apparatus shown in FIG. 2.

FIG. 4 is a diagram showing aspects of optical waveforms or electrical waveforms at various locations (A) to (C) in the CXT measuring apparatus 1.

First, as shown in the top row in FIG. 4, a measurement light, which has been frequency modulated so that the optical waveform (optical frequency over time) becomes a sawtooth wave shape, is generated in the light source section 11.

In other words, the measurement light is generated by controlling so that if the optical frequency at a time $t_0$ is deemed $f_2$, the optical frequency is increased as a linear function of time so that at a time ($t_0+T$) the optical frequency becomes $f_1$, and is then reduced from $f_1$ to $f_2$ at the time ($t_0+T$), and this control is repeated to give a waveform that repeats at a period T.

Here, the period of the frequency modulation is deemed T, and the maximum and minimum values of the frequency are deemed $f_1$ and $f_2$ respectively (where $f_1 > f_2$), and the difference between the maximum and minimum values is deemed $\Delta f = f_1 - f_2$. Furthermore, for the purposes of this description, the output optical power of the light source section 11 during frequency modulation maintains a constant value. However, according to measurement theory, in the present invention the output optical power does not need to be strictly maintained at a constant value. In addition, in the above example, the optical frequency is increased from $f_2$ to $f_1$ over a time T, but clearly, in theory a construction where the optical frequency is decreased from $f_1$ to $f_2$ is also valid.

When measurement light with such an optical waveform is irradiated into one end of the object of measurement DUT, as shown at the bottom of FIG. 3, part of the measurement light is reflected at two reflection points inside the object of measurement DUT, and the transmitted light which passes through the reflection points, and the multiple reflected light (CXT light) which propagates in the same direction as the transmitted light, are emitted from the other end of the object of measurement DUT. The light emitted from the object of measurement DUT is applied to the optical input port IN of the CXT measuring apparatus 1, and sent to the light receiving section 12 via the variable optical attenuator 13. As shown in the second row in FIG. 4, the light input into the light receiving section 12 has an optical waveform in which the transmitted light (the solid line) and the multiple reflected light (the dashed line) have a time difference $\tau$ corresponding to the distance L between the reflection points in the object of measurement DUT.

When this type of input light to the light receiving section 12 is received at the photodetector 12A, as shown in the third line in FIG. 4, an optical frequency difference (beat frequency) component between the transmitted light and the multiple reflected light appears in the electrical signal output from the photodetector 12A. If the modulation period T and the delay time $\tau$ of the measurement light are unsuitable, the beat component is separated into high frequency side and low frequency side components about a center $\Delta f/2$. The signal waveform in the third row of FIG. 4 shows one example of such a separated state. When such an output electrical signal from the photodetector 12A is passed through a band pass frequency filter 12B whose transfer characteristics are a pass frequency of $\Delta f/2$ as shown on the right of the third row in FIG. 4, most of the beat component is removed by the frequency filter 12B, and the output current value from the light receiving section 12 becomes substantially zero.

Figure 5:
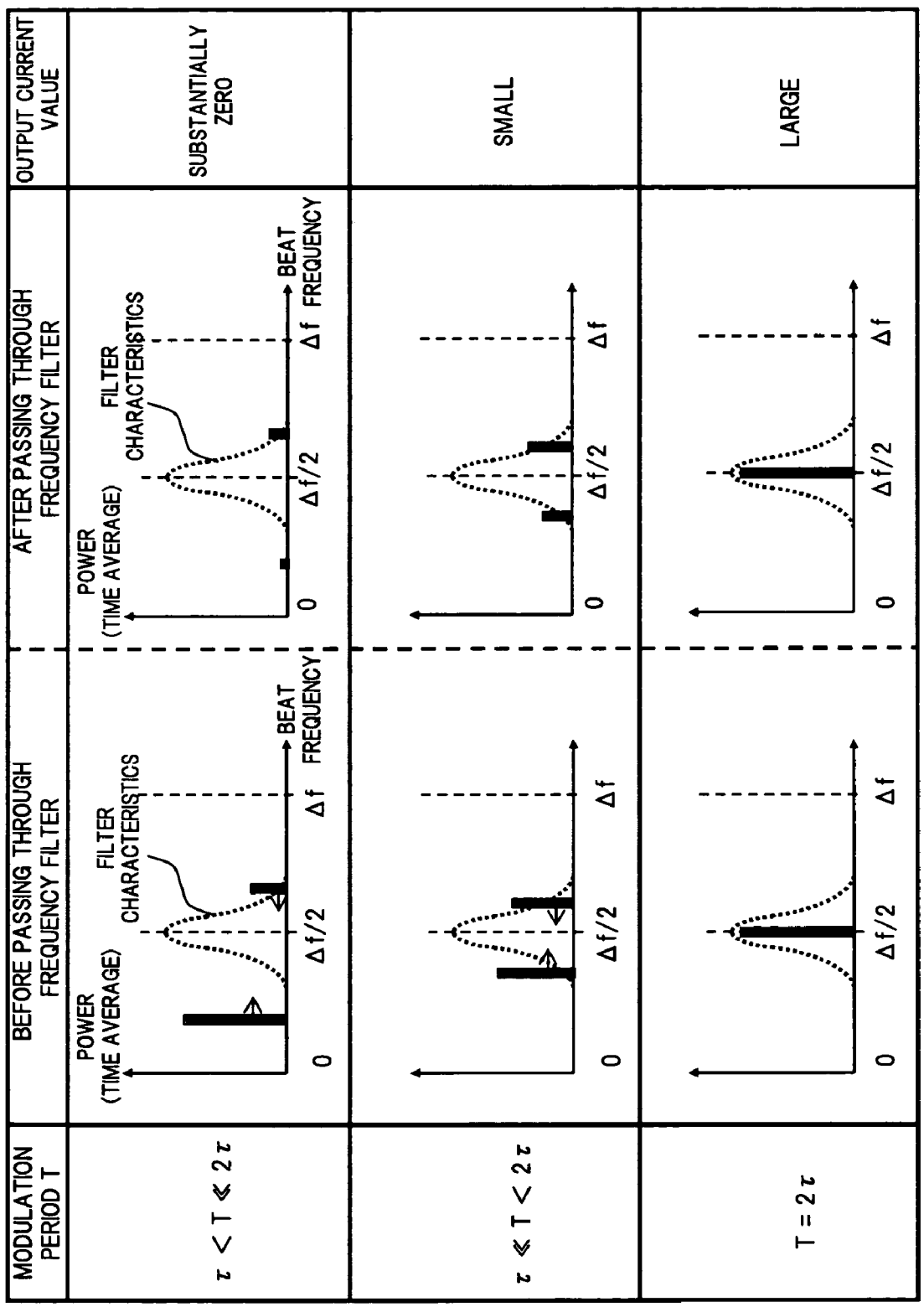
FIG. 5 is a diagram showing aspects of beat components when the modulation period is varied.
Figure 6:
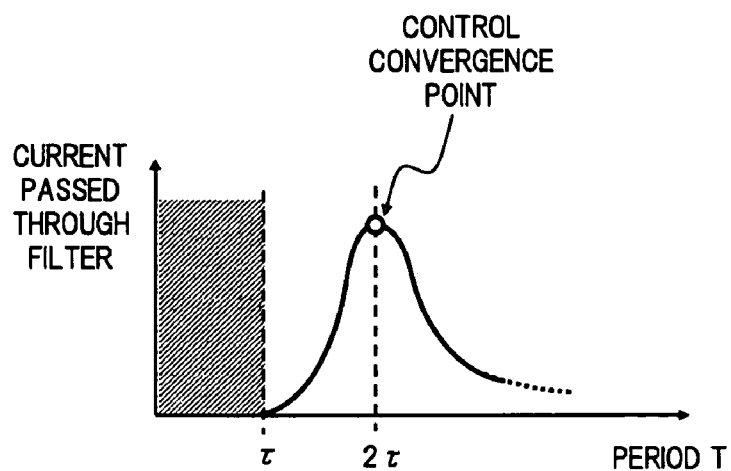
FIG. 6 is a diagram showing a peak of an output current value of a frequency filter in a case where there are two reflection points.

On the other hand, as shown by the white arrow in the fourth row of FIG. 4, if the modulation period T of the measurement light (transmitted light) is lengthened gradually from the state in the second row of FIG. 4, the frequency of the entire beat component output from the photodetector 12A equals $\Delta f/2$ as shown in the fifth row of FIG. 4, when the modulation period T is exactly twice the delay time $\tau$ of the transmitted light and the multiple reflected light ($T=2\tau$). When this signal is passed through the aforementioned frequency filter 12B, the entire beat component passes through the frequency filter 12B, and consequently, the output current from the light receiving section 12 becomes a maximum. FIG. 5 shows the result of consolidating this series of characteristics corresponding to variation of the modulation period T. By adjusting the modulation period T in this manner the beat component (current value) which passes through the frequency filter 12B is changed. Therefore in the control/calculation processing section 14, the modulation period T of the light source section 11 is varied while monitoring the output current value from the light receiving section 12, and as shown in FIG. 6, control of the modulation period T is converged on the point where the current value is at the maximum peak.

Figure 7:
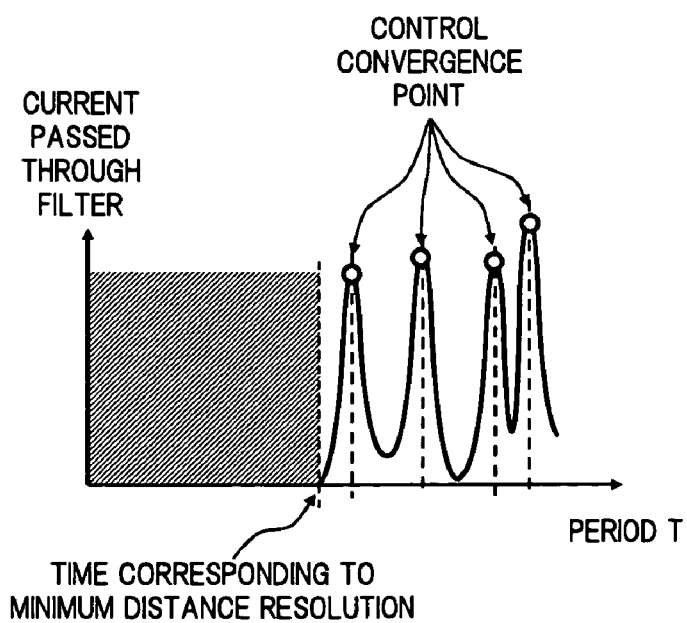
FIG. 7 is a diagram showing the peaks of an output current value of a frequency filter in a case where there are four reflection points.

The frequency region where the modulation period T is shorter than the delay time $\tau$ (the shaded portion in FIG. 6) corresponds to a measurement region which is less than the minimum distance resolution in this measurement method. The minimum distance resolution is described later in detail. Furthermore, here a case was described in which there are two reflection points in the object of measurement DUT, but when there are three or more reflection points in the object of measurement DUT, and the multiple reflected light travels a plurality of paths, a plurality of peaks (four peaks in the example of FIG. 7) appear as shown in FIG. 7, corresponding to the delay time in each path. In such a case, the control of the modulation period T may be converged sequentially corresponding to each peak (local maximum), thereby performing measurement for each of the peaks.

Here is shown a specific example of each of the parameters described above.

Supposing a case where the object of measurement DUT is an optical transmission device, and taking actual operating conditions into account, the distance between the reflection points in the optical transmission device is of the order of approximately several dozen m, and consequently, if a distance L of for example 10 m between reflection points is assumed, the delay time $\tau$ can be determined according to the relationship of the following equation, which uses the speed of light c and the refractive index n in the optical fiber.

$$\tau = (2nL)/c \approx 0.1 \ [\mu s] \quad (2)$$

At this time, if the modulation period T of the measurement light emitted from the light source section 11 is controlled to $2\tau$, the modulation period will be $T=0.2$ [μs], and the modulation frequency will be $(1/T)=5$ [MHz].

When measurement is to be performed at locations where the distance between reflection points is longer than in the example above, the modulation period should be lengthened. Therefore, preferably a measuring distance dynamic range switching function which can switch the initial setting of the modulation period T according to the object of measurement DUT is provided as one function of the CXT measuring apparatus 1.

On the other hand, the maximum value $f_1$ and the minimum value $f_2$ of the optical frequency of the measurement light which is modulated to a sawtooth wave shape, may be any values provided that the frequency difference $\Delta f$ ($f_1 - f_2$) is in a range which lies within the band of the photodetector 12A (normally up to several GHz). Therefore, assuming for example a 1.55 μm optical wavelength band used in optical communication, $\Delta f=1$ [GHz] precisely when $f_1=193.000$ [THz] and $f_2=193.001$ [THz]. Although the difference $\Delta f$ is an extremely small value compared to the absolute values of the optical frequencies $f_1$ and $f_2$, even in a typical semiconductor laser, for example, the amount of variation in the optical frequency relative to the driving current (bias current) can be in the region of several hundred MHz/mA, and therefore, control of the modulation period T under such optical frequency settings can be realized by existing technology.

Figure 8:
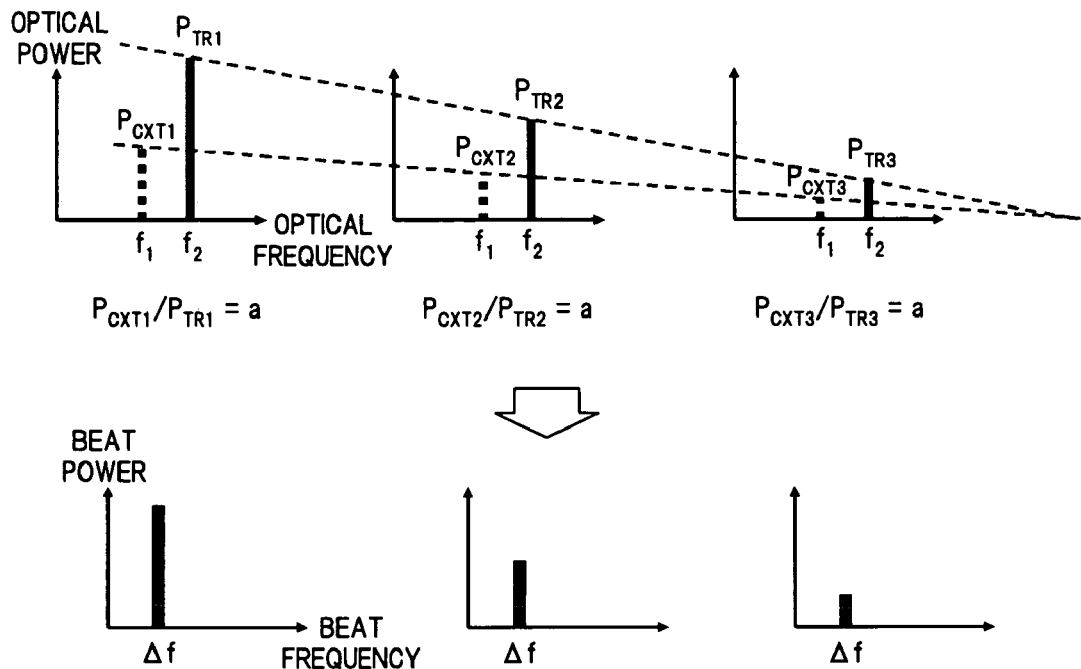
FIG. 8 is a diagram describing a problem encountered when determining the amount of CXT from the power of the beat component.

By the series of operations described above, a beat component can be extracted which has a correlation to the transmitted light power and the multiple reflected light power. Therefore, in the next stage the CXT amount is calculated based on this beat component. One point which causes a problem here is that there is not necessarily a one to one correspondence between the measured power of the beat component, and the CXT amount. In other words, as shown at the top of FIG. 8, for three combinations of transmitted light power and multiple reflected light power ($P_{TR1}$, $P_{CXT1}$), ($P_{TR2}$, $P_{CXT2}$), and ($P_{TR3}$, $P_{CXT3}$), supposing a case where the relative amounts of transmitted light power and multiple reflected power (CXT amounts) are the same for each combination ($P_{CXT1}/P_{TR1}=P_{CXT2}/P_{TR2}=P_{CXT3}/P_{TR3}=a$), but the power of each amount is different ($P_{TR1}{\neq}P_{TR2}{\neq}P_{TR3}$, $P_{CXT1}{\neq}P_{CXT2}{\neq}P_{CXT3}$), then as shown in the bottom of FIG. 8 the current value (the power of the beat component) output from the light receiving section 12 depends on the power of the transmitted light and the power of the multiple reflected light power, and therefore differs each time. In other words, the CXT amount cannot be decided determinately from only the power of the beat component (as an absolute value).

Here, aspects of a case where two lights with different optical frequencies are irradiated into the photodetector 12A are described according to the following equations.

Deeming the angular frequencies of the two lights $\omega_1$ and $\omega_2$, and the envelopes of the electric fields $E_1(t)$ and $E_2(t)$, the electric fields E1 and E2 of the lights are expressed by the following equations (3) and (4).

$$E1 = (1/2) \cdot E_1(t) \cdot \exp(j\omega_1 t) + (1/2) \cdot E_1^*(t) \cdot \exp(-j\omega_1 t) \quad (3)$$

$$E2 = (1/2) \cdot E_2(t) \cdot \exp(j\omega_2 t) + (1/2) \cdot E_2^*(t) \cdot \exp(-j\omega_2 t) \quad (4)$$

where $E^*(t)$ represents a complex conjugate.

When the lights mentioned above are received by the photodetector 12A and converted to an electrical current, the intensity i (t) of that current is proportional to the square of the electric fields (E1+E2) of the irradiated light, as shown by equation (5) below.

$$i(t) \propto (E1 + E2)^2 = \{(1/2) \cdot E_1(t) \cdot \exp(j\omega_1 t) + \\ (1/2) E_1^*(t) \cdot \exp(-j\omega_1 t) + \\ (1/2) E_2(t) \cdot \exp(j\omega_2 t) + \\ (1/2) \cdot E_2^*(t) \cdot \exp(-j\omega_2 t)\}^2 \quad (5)$$

Solving this equation (5) yields equation (6) below. However, since ω1 and ω2 are the angular frequencies of each light and are of THz order, these cannot be detected by the photodetector 12A. Accordingly, the components which oscillate at $\exp(j2\omega_1 t)$, $\exp(j2\omega_2 t)$, and $\exp\{j(\omega_1+\omega_2)t\}$ are ignored completely.

$$i(t) \propto (1/2) \cdot E1(t) \cdot E1^*(t) + (1/2) \cdot E2(t) \cdot E2^*(t) + \\ (1/2) \cdot E1(t) \cdot E2^*(t) \cdot \exp\{j(\omega 1 - \omega 2)t\} + \\ (1/2) \cdot E1^*(t) \cdot E2(t) \cdot \exp\{-j(\omega 1 - \omega 2)t\} \quad (6)$$

The first and second terms of equation (6) are the DC (CW) component, and the third and fourth terms are the beat component which oscillates at the frequency difference between the two lights $\Delta\omega=\omega_1-\omega_2$: beat frequency). Accordingly, provided that the beat frequency fits within the band of the frequency characteristics of the photodetector 12A, the beat component can be detected easily.

Figure 9:
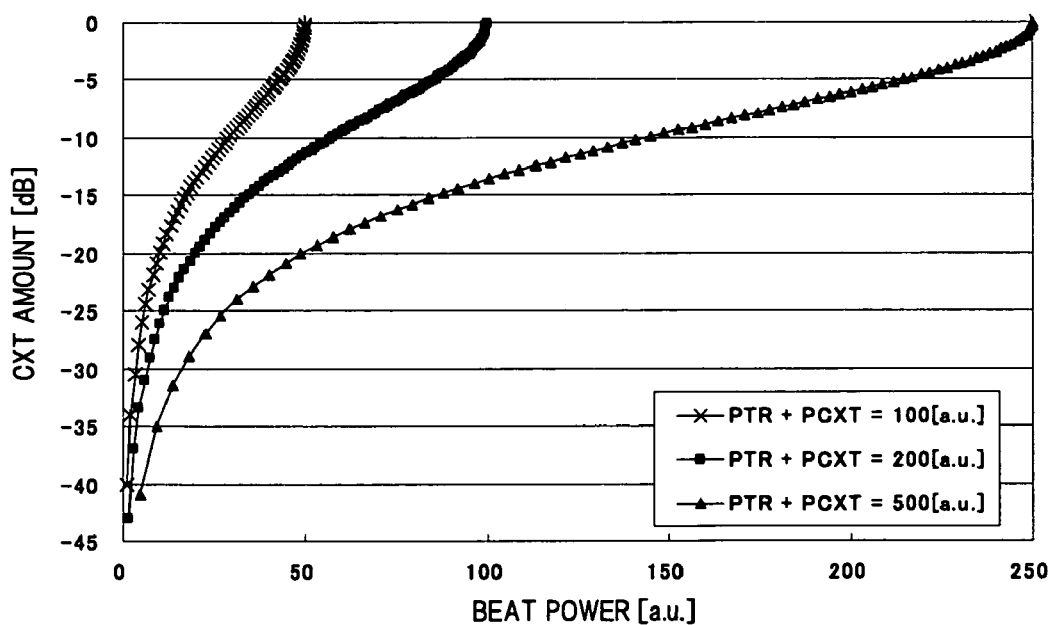
FIG. 9 is a diagram showing an example of calculating a relationship between the CXT amount and the power of the beat component.

FIG. 9 shows one example of the result of calculating the relationship of the CXT amount with respect to the power of the beat component, using the above computational expressions. As described above, even if the power of the beat component can be measured, it is apparent from the calculation results of FIG. 9 that there exist infinitely many corresponding crosstalk amounts, depending on the optical power ($P_{TR}+P_{CXT}$).

Figure 10:
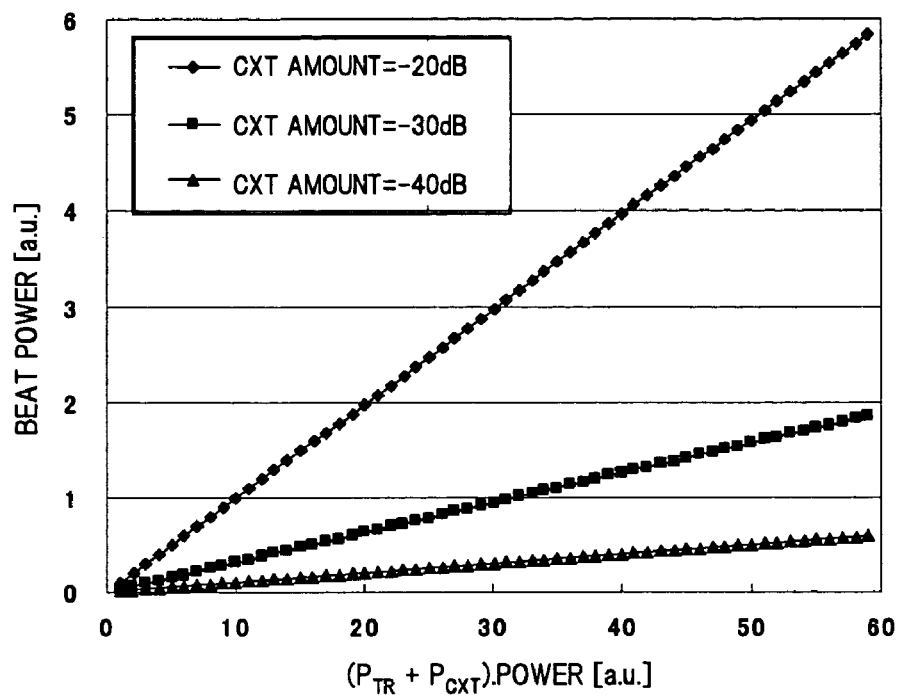
FIG. 10 is a diagram showing one example of calculating a relationship between the power of the beat component and the optical power ($P_{TR}+P_{CXT}$).

However, here as shown in FIG. 10 for example, when the relationship between the power of the beat component and the optical power ($P_{TR}+P_{CXT}$) is calculated using the CXT amount as a parameter, it becomes apparent that the slope of the relationship differs according to the CXT amount. That is, if according to the aforementioned method the modulation period is controlled to T=2τ and the beat component is once extracted, after which the optical power ($P_{TR}+P_{CXT}$) is varied and the ratio of the variation in the power of the beat component at that time is monitored, then the slope can be determined. Therefore it is possible to specify the CXT amount from the power of the beat component.

Therefore the CXT measuring apparatus 1 has a construction in which the variable optical attenuator 13 is positioned before the light receiving section 12, the optical power ($P_{TR}+P_{CXT}$) is varied by controlling the amount of optical attenuation of the variable optical attenuator 13 according to the output signals from the control/calculation processing section 14, and the amount of variation in the beat component detected by the light receiving section 12 is monitored by the control/calculation processing section 14 (FIG. 2). Furthermore, a construction in which the relationship in FIG. 10 between the slope of the straight line and the CXT amount, is tabled by precalculation or actual measurement, and stored in the control/calculation processing section 14, or a construction in which the CXT measuring apparatus 1 has an internal calibration function, are possible.

According to a CXT measuring apparatus 1 to which such a construction is applied, even if a unidirectional optical component such as an optical isolator is positioned in the object of measurement DUT, because the measurement method differs from methods such as conventional OTDR which is based on the detection of reflected light traveling in the opposite direction to the transmitted light of the object of measurement DUT, it is possible to detect the transmitted light and the CXT light directly, and the CXT amount can be measured with high accuracy.

In the CXT measuring apparatus 1 mentioned above, measurement of the CXT amount was achieved by providing a variable optical attenuator 13 before the light receiving section 12. However, in a case where it is only necessary to determine whether or not CXT light has been generated inside the object of measurement DUT, and there is no need to go so far as to measure the amount of CXT light, it is possible to omit the variable optical attenuator 13. In this case, whether or not CXT light is generated in the object of measurement DUT can be determined according to the current value (the power of the beat component) output from the light receiving section 12 when the modulation period is controlled to T=2τ.

Figure 11:
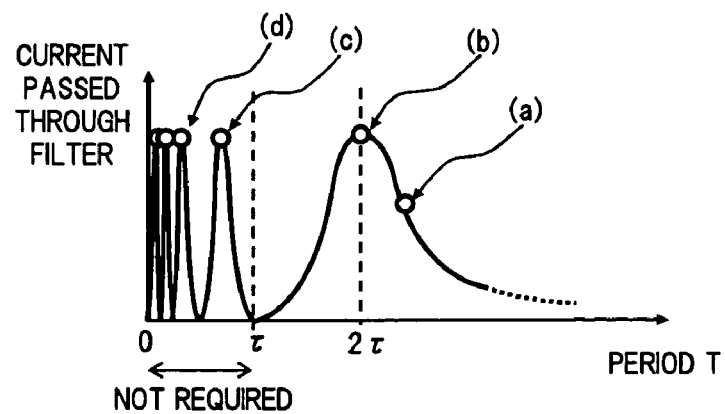
FIG. 11 is a diagram describing the minimum distance resolution of the CXT measuring apparatus of the present invention.
Figure 12:
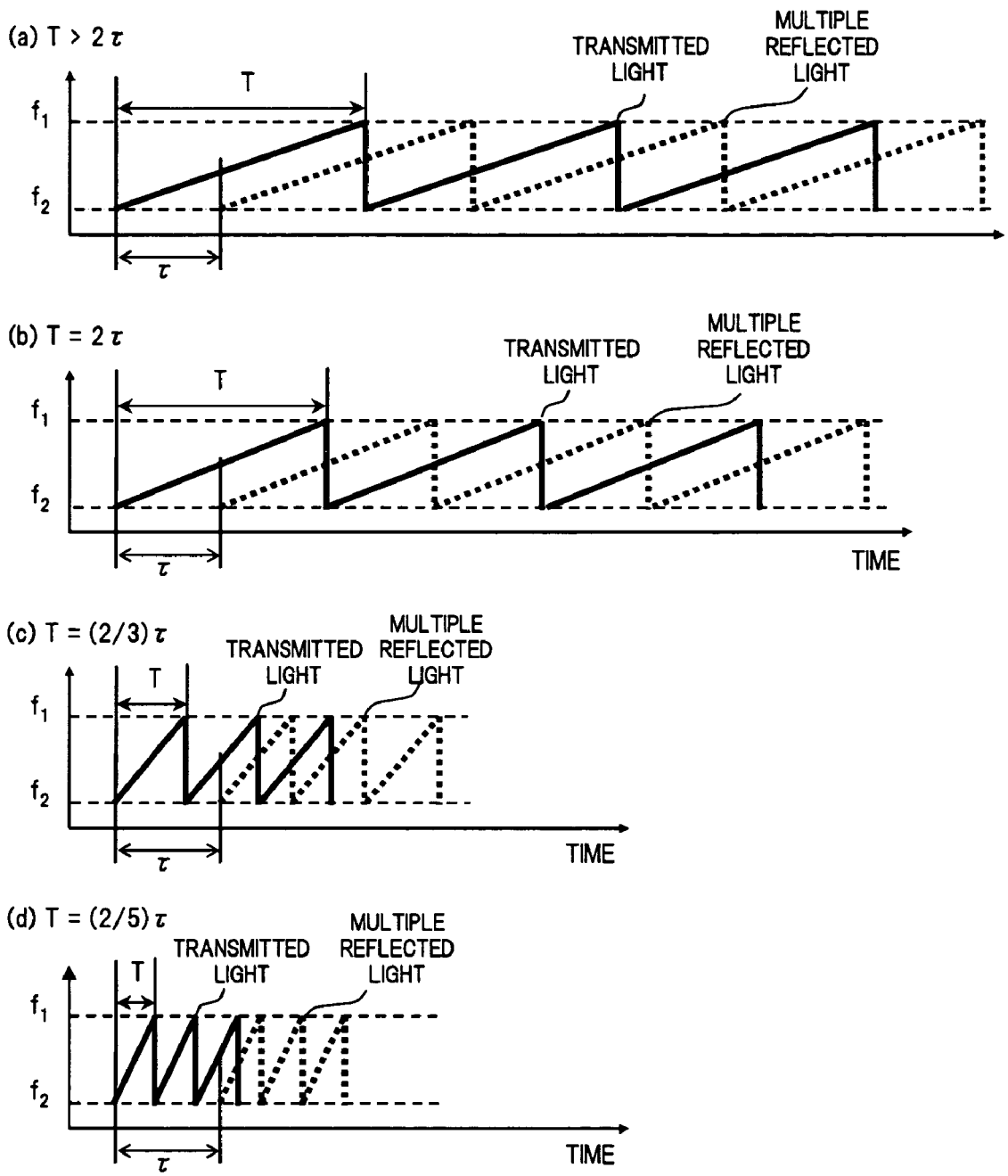
FIG. 12 is a diagram describing the regularity of the appearance of peaks in the current value output from the frequency filter.

Here, the minimum distance resolution of the abovementioned CXT measuring apparatus 1 is specifically described, using FIG. 11 and FIG. 12.

In the present CXT measuring apparatus 1, the modulation period T is scanned over a wide range in order to examine a plurality of multiple reflected lights. At this time, assuming that there was only one path (two reflection points) of multiple reflected light, then as shown in FIG. 11, as the modulation period T shortens, a plurality of peaks, such as a secondary peak (c point) and tertiary peak (d point) appear in the current value output from the frequency filter 12B, as shown in FIG. 11. Because the secondary and tertiary peaks and so on are caused by multiple reflected light in the same path, none of the peaks except for the first primary peak (b point) are required for measurement, and it is possible that these peaks may be mistaken for peaks caused by multiple reflected light in a different path. Accordingly, it is appropriate to set as the minimum distance resolution of the CXT measuring apparatus 1, the modulation period T=τ at which the current value between the primary peak and the secondary peak is the minimum.

However, even when T=τ is considered to be the minimum distance resolution of the CXT measuring apparatus 1, as shown in the second row onward of FIG. 12, there is regularity in the appearance of peaks in the current value, and a peak always occurs at a period T according to the relationship of the following equation (7).

$$T=2/(2k+1)\cdot\tau(k=0, 1, 2, \ldots) \quad (7)$$

Therefore, when measuring the CXT amount, if the setting is such that at the point in time when the first peak (T=2τ) is detected, subsequent peaks are estimated and then ignored, measurement can also be performed in regions where the modulation period T is τ or below.

Next, a specific example of the abovementioned CXT measuring apparatus 1 is described.

Figure 13:
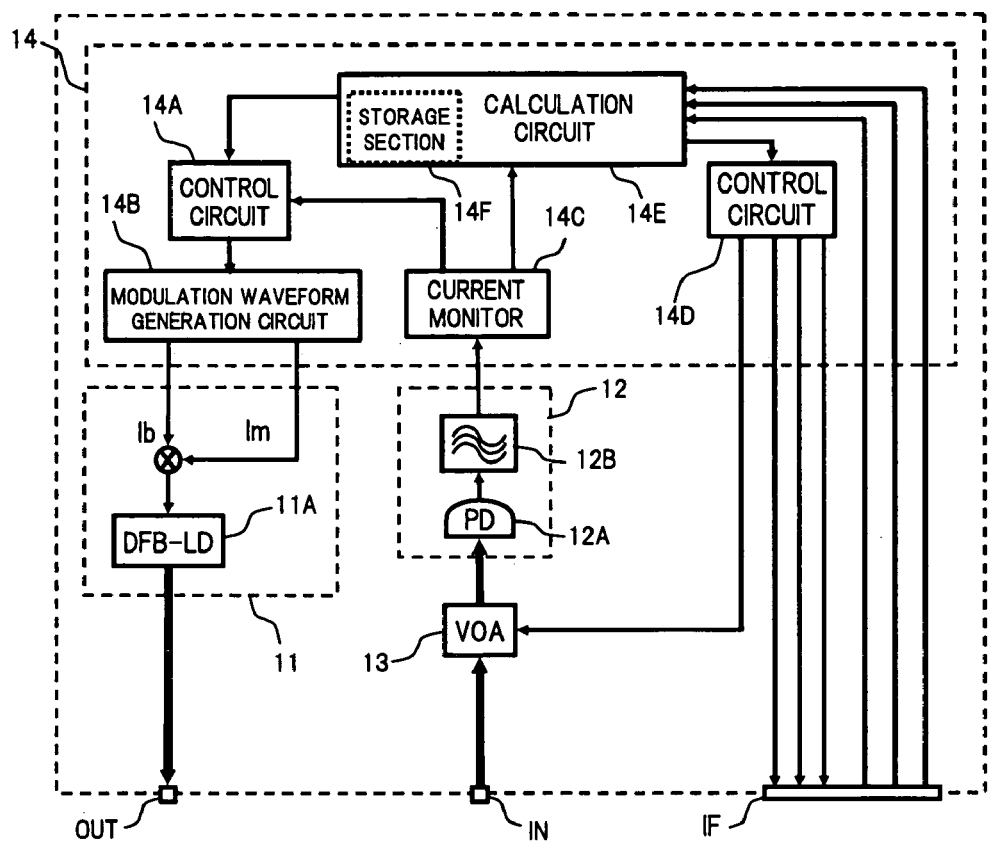
FIG. 13 is a block diagram showing the overall construction of a specific example of a CXT measuring apparatus according to the present invention.

FIG. 13 is a block diagram showing the overall construction of this example.

The construction of the example shown in FIG. 13 corresponds to an example in which a calibrator is used as a method of calculating in advance the aforementioned relationship between the power of the beat component and the CXT amount. Specifically, an interface IF for connecting the calibrator described below, before commencing measurement is provided on the CXT measuring apparatus 1, and the calibrator interface IF is connected to the control/calculation processing section 14. Furthermore, here the control/calculation processing section 14 comprises: a control circuit 14A and a modulation waveform generation circuit 14B for controlling the operation of the light source section 11; a current monitor 14C which measures the current output from the light receiving section 12; a control circuit 14D for controlling the amount of optical attenuation of the variable optical attenuator 13; and a calculation circuit 14E furnished inside with a storage section 14F.

In addition, in the present example, a distributed feedback laser diode (DFB-LD) 11A is used as a specific example of the light source section 11. In a DFB-LD the oscillation frequency changes when the injection current changes. Therefore, a construction where the light source section 11 is driven by a combination of a biasing current Ib and a frequency modulating current Im is applied to the light source section 11. When the light source section 11 has such a construction, the optical output power of the DFB-LD 11A also varies according to the frequency modulating current Im. However, provided that the peak of the current (see FIG. 6) output from the frequency filter 12B of the light receiving section 12 remains within a detectable range, variation in the optical output power is not a problem. More specifically, the narrower the pass bandwidth of the frequency filter 12B, the greater the tolerance for variation of the optical output power. Furthermore, using a DFB-LD 11A with a good FM modulation efficiency [Hz/A] means that there is relatively little variation in the optical output power.

In the CXT measuring apparatus 1 with the construction described above, first, before measurement commences, the calibrator is connected, and CXT light is generated by simulating a multiple reflected state. The CXT amounts and the power of the beat component at each optical power $(P_{TR}+P_{CXT})$ are then measured, thereby acquiring the aforementioned information corresponding to FIG. 10. These measurement results are then stored in the storage section 14F inside the calculation circuit 14E.

Figure 14:
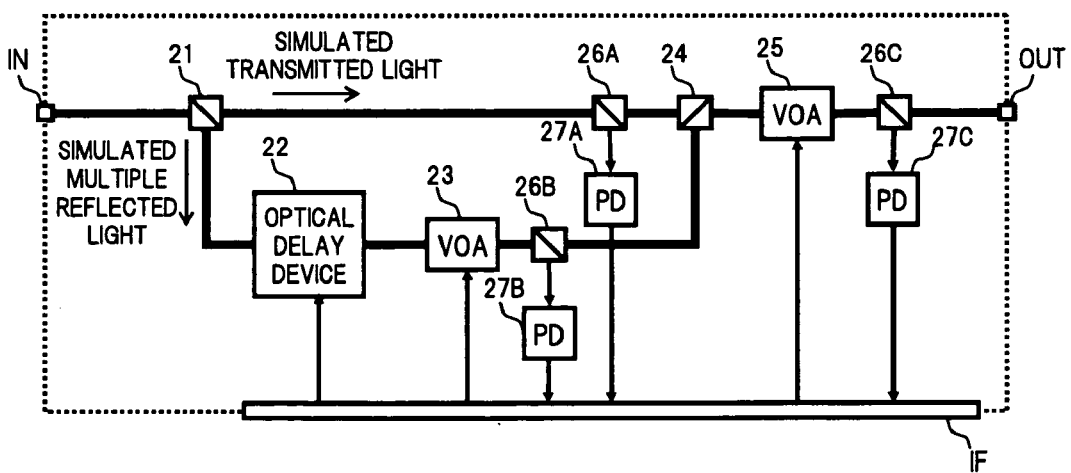
FIG. 14 is a diagram showing a configuration example of a calibrator used in the CXT measuring apparatus.

As a specific construction of the calibrator, it is possible to apply a construction which uses a variable optical attenuator as shown in FIG. 14, for example. In the configuration example shown in FIG. 14, the measurement light applied to the input port IN of the calibrator 20 via the output port OUT of the CXT measuring apparatus 1 is demultiplexed by simulation in an optical demultiplexer 21 into components corresponding to the transmitted light and the multiple reflected light, the multiple reflected light is passed through an optical delay device 22 which applies a variable optical transmission delay, and a variable optical attenuator (VOA) 23, after which the multiple reflected light is recombined with the transmitted light from the optical demultiplexer 21 in an optical multiplexer 24. In the process so far, an optional CXT amount has been generated. Subsequently, the light combined in the optical multiplexer 24 is applied to the variable optical attenuator (VOA) 25, and by varying the amount of optical attenuation thereof, the optical power $(P_{TR}+P_{CXT})$ is adjusted to an optional value. Control of the optical delay device 22 and the variable optical attenuators 23 and 25 at this time is performed according to signals applied from the CXT measuring apparatus 1 via the interface IF. Furthermore, the power of the transmitted light is monitored by an optical coupler 26A and a photodetector 27A, and the power of the multiple reflected light is monitored by an optical coupler 26B and a photodetector 27B. In addition, the optical power $(P_{TR}+P_{CXT})$ adjusted by the variable optical attenuator 25 is monitored by an optical coupler 26C and a photodetector 27C. As a result, calibration is performed by measuring in the CXT measuring apparatus 1, the CXT amount as well as the power of the beat component when the parameters of the optical power $(P_{TR}+P_{CXT})$ are varied, and storing the results in the storage section 14F of the calculation circuit 14E corresponding to each parameter.

Figure 15:
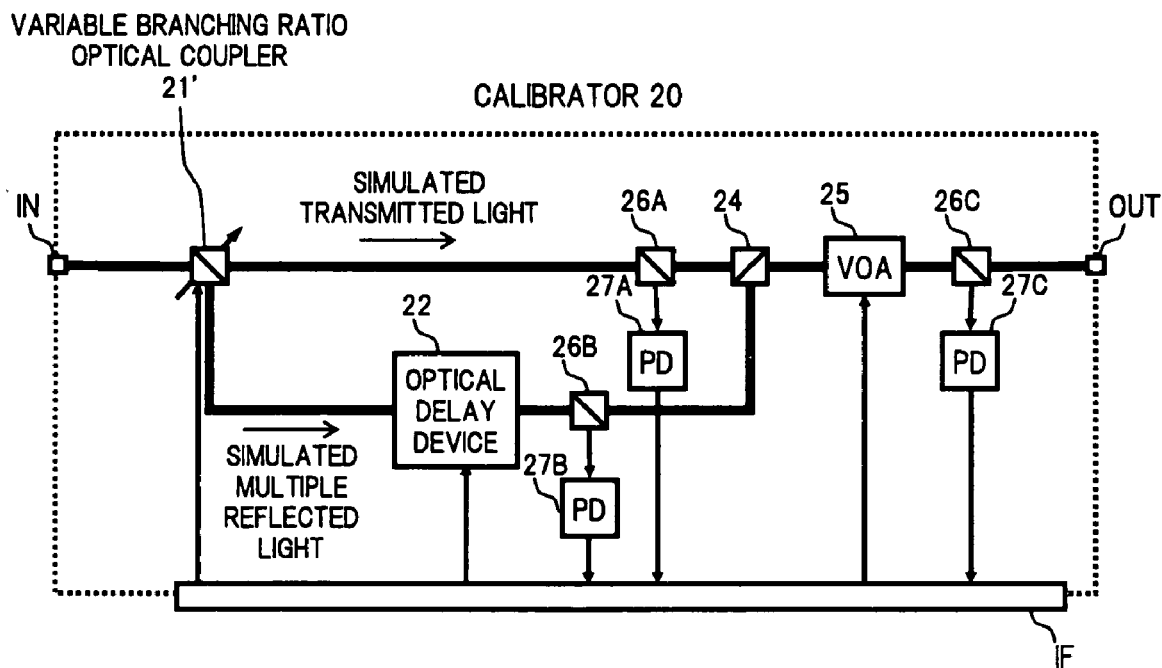
FIG. 15 is a diagram showing another configuration example of a calibrator used in the CXT measuring apparatus.

In the configuration example of the calibrator 20 shown in FIG. 14, the CXT amount is adjusted by providing a variable optical attenuator 23 on the optical path through which the simulated multiple reflected light propagates. However the variable optical attenuator may also be provided on the optical path through which the simulated transmitted light propagates. Positioning a variable optical attenuator on both optical paths enables the setting of CXT amounts over a wider range. Furthermore, a configuration example was described for the calibrator 20 in which a variable optical attenuator is used, but an alternative construction for example as shown in FIG. 15, in which a variable branching ratio optical coupler 21' is used instead of the optical demultiplexer 21 and the variable optical attenuator 23 of FIG. 14 may also be applied. In this configuration example, an optional CXT amount can be realized by adjusting the branching ratio of the variable branching ratio optical coupler 21' according to signals applied via the interface IF from the CXT measuring apparatus 1. In addition, here a construction was used as an example in which the CXT measuring apparatus 1 and the calibrator 20 are separate, but an integrated construction in which the calibrator is provided inside the CXT measuring apparatus 1 may also be applied.

Once this calibration is completed using the calibrator 20, it is possible to measure the CXT amount of the object of measurement DUT using the CXT measuring apparatus 1. During the actual measurement, as described above, first the modulation frequency of the light source section 11 is controlled, and the control is converged so that the modulation period becomes T=2τ, after which the power of the beat component is monitored while varying the variable optical attenuator 13. By comparing the results of the monitoring with the information stored in the storage section 14F prior to measurement, the CXT amount of the object of measurement DUT is specified.

Figure 16:
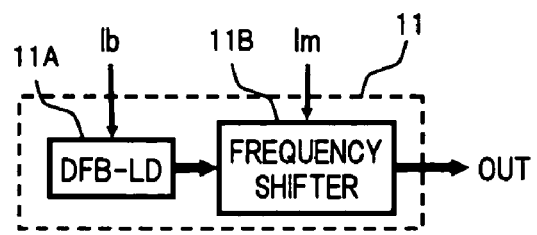
FIG. 16 is a diagram showing another configuration example of a light source section of the CXT measuring apparatus.

In the configuration example shown in FIG. 13, as a specific example of the light source section 11, a construction was shown in which the light source section 11 is modulation driven by applying a signal in which a biasing current Ib and a frequency modulating current Im are combined, directly to the DFB-LD 11A. However the construction of the light source in the present invention is not limited to this example. For example, as shown in FIG. 16, the light source section 11 may be constructed using the DFB-LD 11A and a frequency shifter 11B. In this construction, the DFB-LD 11A is driven by a biasing current Ib, and the CW light emitted from the DFB-LD 11A is applied to the frequency shifter 11B and frequency modulated according to a frequency modulating current Im. In this case, the power of the measurement light does not change according to the frequency modulating current Im as it does when the DFB-LD 11A is modulated directly, and consequently it is possible to measure the CXT amount in a more stable manner.

Figure 17:
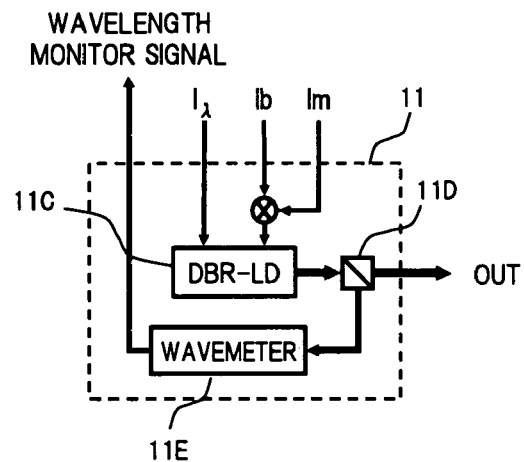
FIG. 17 is a diagram showing a configuration example of when a variable wavelength light source is used in the light source section of the CXT measuring apparatus.
Figure 18:
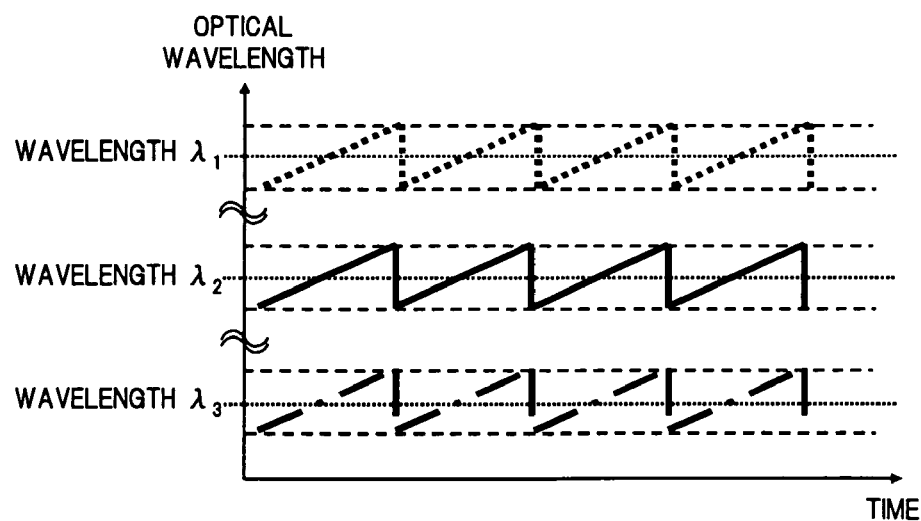
FIG. 18 is a diagram showing one example of measurement light output from the light source section shown in FIG. 17.

Furthermore, for example as shown in FIG. 17, the light source section 11 may be constructed using a wavelength variable light source. Specifically, in the configuration example of FIG. 17, a distributed Bragg reflector laser diode (DBR-LD) 11C is used as the wavelength variable laser, the DBR-LD 11C is driven by the biasing current Ib and the frequency modulating current Im from the control/calculation processing section 14, and the wavelength of the DBR-LD 11C is controlled according to a wavelength control signal $I_\lambda$. Furthermore, a portion of the measurement light emitted from the DBR-LD 11C is branched at the optical coupler 11D, the branched light is applied to a wavemeter 11E where the wavelength of the measurement light is monitored, and a wavelength monitor signal which indicates the monitoring results is then output to the control/calculation processing section 14. In the configuration examples of the light source section 11 shown in FIG. 13 and FIG. 16, because the wavelength of the measurement light is fixed at the oscillation wavelength of the DFB-LD 11A, then for example when the intention is to measure the CXT amounts respectively corresponding to the various optical ports in a wavelength mux/demux device used in a wavelength division multiplexing (WDM) optical transmission system, measurement can only be performed for the wavelength ports which match the oscillation wavelength of the DFB-LD 11A. In contrast, in the configuration example of the light source section 11 shown in FIG. 17, by varying the wavelength of the DBR-LD 11C from $\lambda_1$ to $\lambda_2$ to $\lambda_3$ in a stepped manner as illustrated in FIG. 18, according to a wavelength grid conforming to the ITU-T standards defined for WDM systems, it is possible to measure CXT light corresponding to each wavelength port of the wavelength mux/demux device.

Next, a specific example is described in which the aforementioned CXT measuring apparatus 1 is applied to a WDM transmission system.

Figure 19:
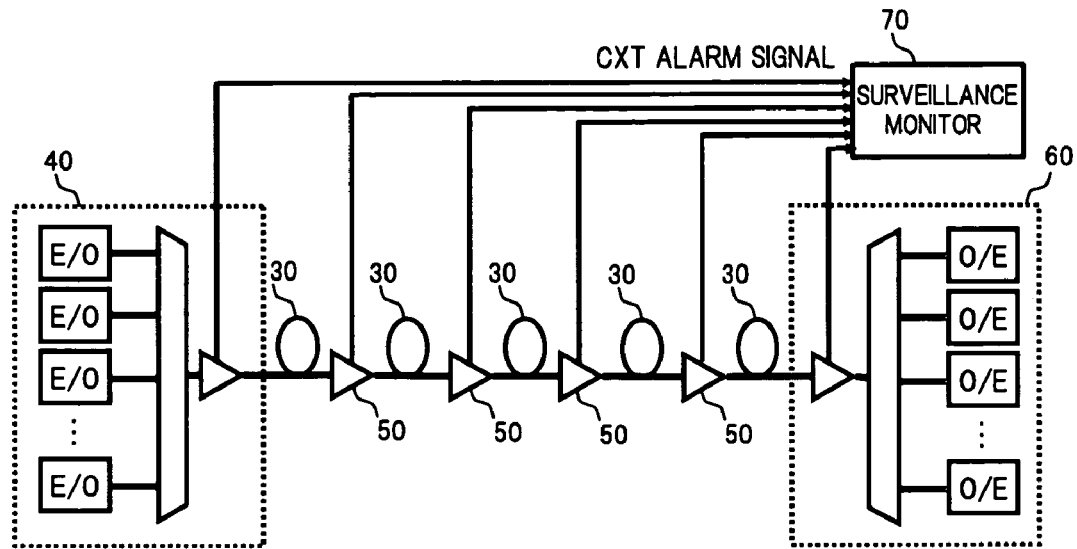
FIG. 19 is a diagram showing the overall construction of an example where the CXT measuring apparatus of the present invention is applied to a WDM optical transmission system.

FIG. 19 shows the overall construction of an example of the WDM transmission system.

In FIG. 19, the WDM optical transmission system comprises, for example: an optical transmitting station 40 which transmits WDM light consisting of a plurality of optical signals with different wavelengths, to a transmission path 30; a plurality of optical repeater stations 50 positioned at appointed intervals on the transmission path 30; and an optical terminal station 60 which receives the WDM signal light repeated from the optical transmitting station 40 via the transmission path 30 and the optical repeater stations 50. Furthermore, the above described CXT measuring apparatus 1 is built into each of the stations mentioned above, measurement to determine whether CXT light has been generated is performed at the local station by each CXT measuring apparatus 1, and the measurement results are managed collectively by a surveillance monitor 70.

Figure 20:
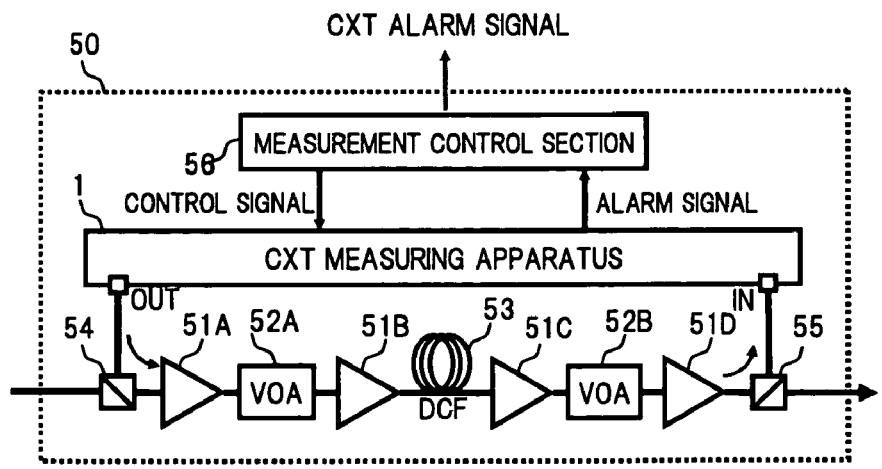
FIG. 20 is a diagram showing a configuration example of an optical repeater station in the WDM optical transmission system of FIG. 19.

The optical repeater stations 50 with the built in CXT measuring apparatuses 1 may have the construction shown for example in FIG. 20. Specifically, a plurality of optical amplifiers 51A to 51D (which typically include an optical isolator) are multistage connected between the input and output ports of the optical repeater station 50, and variable optical attenuators (VOA) 52A and 52B and a dispersion compensating fiber (DCF) 53 are provided between the various optical amplifier stages. In such a construction, it is possible for the connection points or the like between each of the optical components to act as reflection points for the WDM signal light, and in this state, light which has undergone multiple reflections at a plurality of reflection points can become CXT light. Therefore in order to detect this CXT light, an optical multiplexer 54 is provided before the first stage optical amplifier 51A, and an optical splitter 55 is provided after the final stage optical amplifier 51D, the measurement light output from the optical output port OUT of the CXT measuring apparatus 1 is sent to the main signal system via the optical multiplexer 54, and the light which passes through the various optical components is acquired by the optical splitter 55 and then returned to the optical input port IN of the CXT measuring apparatus 1. Here, whether or not CXT light is generated in the optical repeater station is detected by the CXT measuring apparatus 1, and when CXT light generation is detected, an alarm signal is generated from the CXT measuring apparatus 1. In this case, there is no particular need for the CXT measuring apparatus 1 to measure the specific CXT amount, and consequently it is possible to omit the variable optical attenuator 13 in the CXT measuring apparatus 1 (see FIG. 2 or FIG. 13).

When an alarm signal is emitted from the CXT measuring apparatus 1, the alarm signal is transmitted to a measurement control section 56, and a CXT alarm signal is transmitted from the measurement control section 56 to the surveillance monitor 70. Furthermore, the measurement control section 56 also generates the control signals for executing CXT light measurement in the CXT measuring apparatus 1. The CXT alarm signal may also be transmitted as far as the surveillance monitor 70, carried on the monitoring light (SV light) or the like which is transmitted between the stations.

Figure 21:
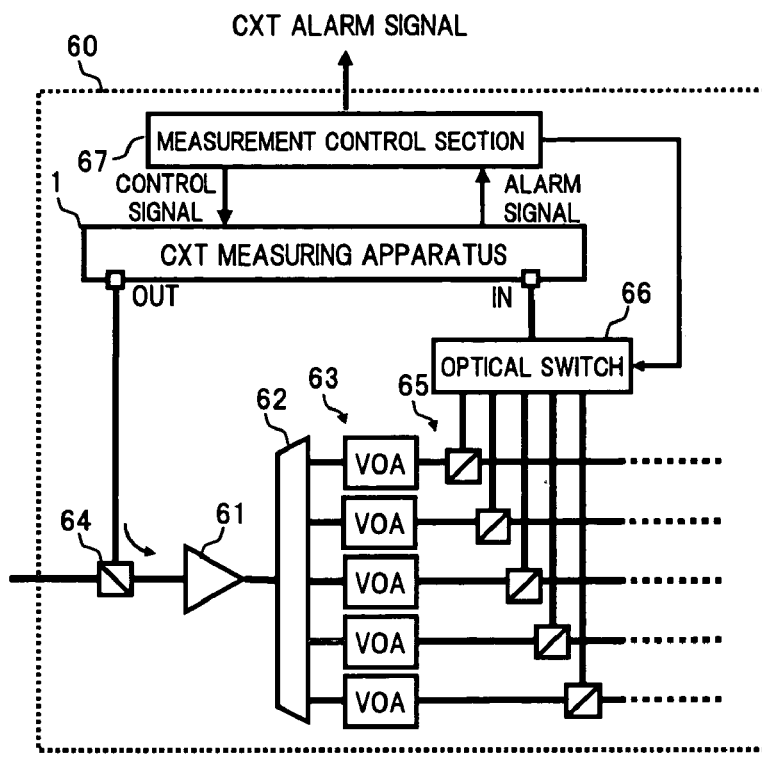
FIG. 21 is a diagram showing a configuration example of an optical terminal station in the WDM optical transmission system of FIG. 19.
Figure 22:
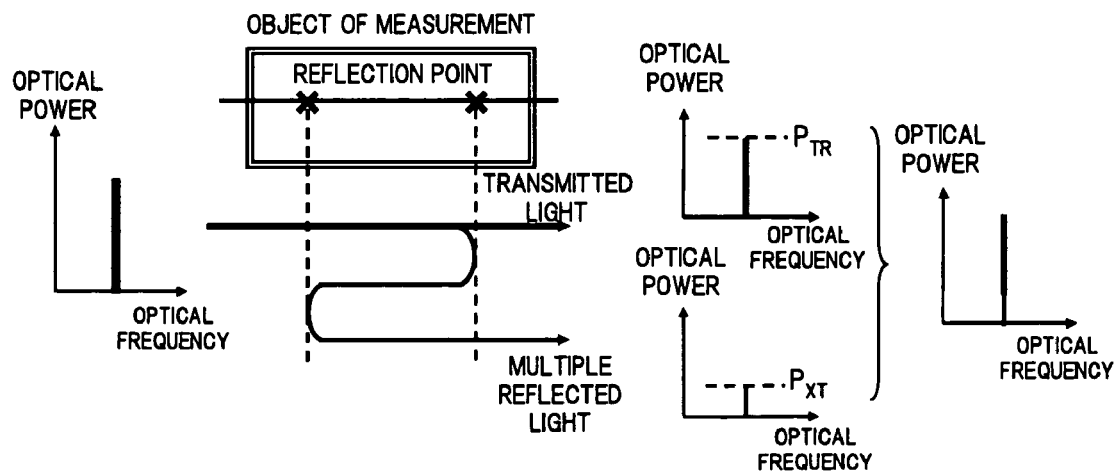
FIG. 22 is a diagram for describing a typical state where CXT light is generated.
Figure 23:
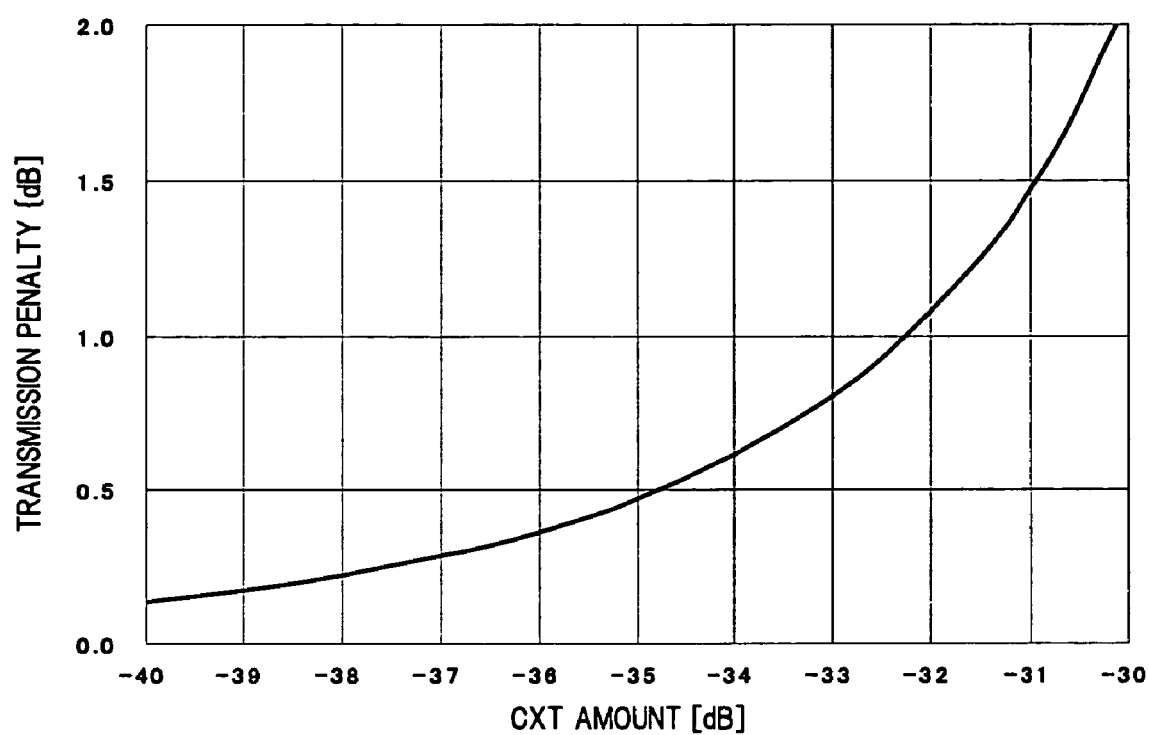
FIG. 23 is a diagram showing one example of calculating the relationship of the signal quality with respect to the CXT amount.

Furthermore, for the optical terminal station 60 built into the CXT measuring apparatus 1, for example the construction shown in FIG. 21 may be used. Specifically, in the optical terminal station 60 shown in FIG. 21, the WDM light which propagates through the transmission path 30 and is applied to the input port is first amplified to the required level in an optical amplifier 61 and then branched into distinct wavelengths in an optical wavelength demultiplexer 62, after which the optical signals of each wavelength are output from each of the corresponding wavelength ports. The optical signals output from the wavelength ports of the optical wavelength demultiplexer 62 are here sent to an optical receiver (not shown) via variable optical attenuators (VOA) 63 and the like which adjust the level of each signal. In such a construction, it is possible for the connection points or the like between the optical amplifier 61, the optical wavelength demultiplexer 62, and the variable optical attenuator (VOA) 63, to act as reflection points for the optical signals, and in this state light which has undergone multiple reflections at a plurality of reflection points can become CXT light. Consequently, in the same manner as in the optical repeater stations 50 described above, an optical multiplexer 64 is provided before the optical amplifier 61 while an optical splitter 65 is provided after each of the variable optical attenuators 63 corresponding the wavelength ports of the optical wavelength demultiplexer 62. In addition, an optical switch 66 which switches the light branched in each optical splitter 65 is positioned, the measurement light output from the output port OUT of the CXT measuring apparatus 1 is sent to the main signal system via the optical multiplexer 64, and the light which passes through the various optical components is taken out by the optical splitters 65 and the optical switch 66, and returned to the optical input port IN of the CXT measuring apparatus 1. As the CXT measuring apparatus 1 built into the optical terminal station 60, a device in which a wavelength variable light source is used as the light source section 11, as shown in FIG. 17, is applied, to enable the generation of measurement light with wavelengths corresponding to each wavelength port of the optical wavelength demultiplexer 62. Furthermore, here also, as a configuration in which whether or not CXT light is generated in the optical terminal station is detected and an alarm signal is generated, it is possible to use a CXT measuring apparatus 1 in which the variable optical attenuator 13 is omitted.

When an alarm signal is emitted from the CXT measuring apparatus 1, the alarm signal is transmitted to a measurement control section 67, and a CXT alarm signal is transmitted from the measurement control section 67 to the surveillance monitor 70. Furthermore, the measurement control section 67 generates the control signals for executing CXT light measurement in the CXT measuring apparatus 1, and for controlling the wavelength of the measurement light, and also generates the control signals for switching the optical path of the optical switch 66 to correspond to the wavelength of the measurement light.

According to a WDM light transmission system with the above construction, information relating to the generation of CXT light on the optical path of the main signal system between the optical transmitting station 40 and the optical terminal station 60 is gathered and monitored by the surveillance monitor 70. Therefore it is possible to reliably detect which locations in the entire system, which is made up of a large number of components, are generating CXT light, and provide a prompt and easy solution to the problem.

Moreover, in the above WDM optical transmission system, a system is employed in which the generation of CXT light is detected at each station and an alarm signal is generated. However, for example, it is also possible to measure the specific CXT amount in the local station and emit an alarm signal when the measurement result exceeds a predetermined CXT amount threshold value. In this case, a variable optical attenuator 13 for varying the optical power ($P_{TR}+P_{CXT}$) is provided in the CXT measuring apparatus 1 built into each station. Furthermore, in the configuration example of the optical terminal station 60 shown in FIG. 21, the branched light from the optical splitters 65 is switched by the optical switch 66, but even if for example a star coupler is provided in place of the optical switch 66, it is possible to measure whether or not CXT light corresponding to each wavelength is generated, or the amount of CXT light. In addition, a case was described in which a WDM transmission system is constructed using the CXT measuring apparatus 1 of the present invention, but the construction of systems to which the CXT measuring apparatus of the present invention can be applied is not limited to the one example described above.

What is claimed is:

1. A method of measuring coherent crosstalk light generated by multiple reflection of light between a plurality of reflection points existing within an object of measurement, comprising:

generating measurement light in which the frequency of a light emitted from a laser light source operating under single longitudinal mode oscillation is modulated to a sawtooth wave shape at a variable period;

irradiating the generated measurement light into one end of an optical path which passes through the inside of said object of measurement;

receiving the light emerging from the other end of the optical path of said object of measurement by an optical receiver and converting to an electrical signal;

applying the converted electrical signal to a frequency filter, and extracting a beat component of a frequency corresponding to half the difference between the maximum value and minimum value of the optical frequency of said measurement light;

controlling the modulation period of said measurement light so that the power of the extracted beat component becomes a local maximum; and measuring whether or not coherent crosstalk light is generated in said object of measurement, based on the power of the beat component which has become the local maximum due to control of said modulation period.

2. A method of measuring coherent crosstalk light according to claim 1, comprising:

varying an optical attenuation amount of a variable optical attenuator which is provided prior to said optical receiver, while keeping constant the modulation period which is controlled so that the power of said extracted beat component becomes the local maximum; and measuring the amount of coherent crosstalk light generated in said object of measurement, based on the rate of variation in the power of the beat component caused by variation in said optical attenuation amount.

3. A method of measuring coherent crosstalk light according to claim 1, comprising varying the wavelength of light emerging from said laser light source, and measuring coherent crosstalk light corresponding to the wavelength of the measurement light.

4. A method of measuring coherent crosstalk light according to claim 2, comprising pre-acquiring and storing information showing a relationship between the amount of coherent crosstalk light generated and the power of the beat component; and comparing the rate of variation in the power of the beat component caused by variation in said optical attenuation amount, and said stored information to thereby specify the amount of coherent crosstalk light generated in said object of measurement.

5. A measuring apparatus for measuring coherent crosstalk light generated by multiple reflection of light between a plurality of reflection points existing within an object of measurement, comprising:

a light source section which generates a measurement light in which the frequency of a light emitted from a laser light source operating under single longitudinal mode oscillation is modulated to a sawtooth wave shape at a variable period;

an optical output port for irradiating the measurement light generated by said light source section into one end of an optical path which passes through the inside of said object of measurement;

an optical input port to which the light emitted from the other end of the optical path of said object of measurement is applied;

a light receiving section which receives the light from said optical input port using an optical receiver and converts the light to an electrical signal, and then applies the electrical signal to a frequency filter, and extracts a beat component of a frequency which corresponds to half the difference between the maximum value and minimum value of the optical frequency of said measurement light;

a modulation period control section which controls the modulation period of the measurement light generated by said light source section so that the power of the beat component extracted by said light receiving section becomes a local maximum; and a measuring section which measures whether or not coherent crosstalk light is generated in said object of measurement, based on the power of the beat component which has become the local maximum due to control of the modulation period by said modulation period control section.

6. A measuring apparatus according to claim 5, comprising;

a variable optical attenuator provided on an optical path between said input port and said light receiving section, and an optical attenuation amount control section which varies the optical attenuation amount of said variable optical attenuator, while keeping constant the modulation period controlled by said modulation period control section so that the power of the beat component extracted by said optical receiving section becomes the local maximum, and said measuring section measures the amount of coherent crosstalk light generated in said object of measurement, based on a rate of variation in the power of the beat component produced by varying the optical attenuation amount of said variable optical attenuator by said optical attenuation amount control section.

7. A measuring apparatus according to claim 5, wherein said light source section generates measurement light by applying drive signal in which a bias current and a frequency modulation current are mixed, to said laser light source.

8. A measuring apparatus according to claim 5, wherein said light source section has; a laser light source which is driven by a bias current signal, and a frequency shifter which generates in accordance with a frequency modulation current signal, measurement light in which continuous light emerging from said laser light source is frequency modulated.

9. A measuring apparatus according to claim 5, wherein
in said light source section, the wavelength of light emerging from said laser light source is variable, and
said measuring section measures coherent crosstalk light corresponding to the wavelength of measurement light generated in said light source section.

10. A measuring apparatus according to claim 6, comprising
a storage section which pre-acquires and stores information showing a relationship between the amount of coherent crosstalk light generated and the power of the beat component,
and said measuring section compares the rate of variation in the power of the beat component caused by variation in an optical attenuation amount of said variable optical attenuator by said optical attenuation amount control section, and the information stored in said storage section to thereby specify the amount of coherent crosstalk light generated in said object of measurement.

11. A measuring apparatus according to claim 10, wherein the information stored in said storage section is pre-acquired using a calibrator which can generate coherent crosstalk light in a simulated manner.

12. A measuring apparatus according to claim 11, wherein said calibrator comprises:
an optical demultiplexer which branches input light into two lights;
an optical multiplexer which recombines the two lights branched in said optical demultiplexer;
an optical delay device which applies a variable optical transmission delay to the light which propagates through one optical path of two optical paths which connect between said optical demultiplexer and said optical multiplexer;
a first variable optical attenuator which adjusts the power of the light which propagates through at least one of said two optical paths; and
a second variable optical attenuator which adjusts the power of the light which is combined by said optical multiplexer.

13. A measuring apparatus according to claim 11, wherein said calibrator comprises:
a variable branching ratio optical coupler which branches input light into two lights in an optional proportion;
an optical multiplexer which recombines the two lights branched in said variable branching ratio optical coupler;
an optical delay device which applies a variable optical transmission delay to the light which propagates through one optical path of two optical paths which connect between said variable branching ratio optical coupler and said optical multiplexer; and
a variable optical attenuator which adjusts the power of the light which is combined by said optical multiplexer.

* * * * *